(12) United States Patent
Boschet et al.

(10) Patent No.: US 9,175,243 B2
(45) Date of Patent: Nov. 3, 2015

(54) STRIPPING COMPOSITION FOR A MOLD FOR MAKING A COMPOSITE MATERIAL PART, AND METHOD OF PREPARING

(75) Inventors: Patrick Boschet, Montigny le Bretonneux (FR); Emmanuel Piel, Montrouge (FR)

(73) Assignee: Airbus Helicopters, Marignane (FR)

( * ) Notice: Subject to any disclaimer, the term of this patent is extended or adjusted under 35 U.S.C. 154(b) by 163 days.

(21) Appl. No.: 12/880,815

(22) Filed: Sep. 13, 2010

(65) Prior Publication Data

US 2010/0331438 A1 Dec. 30, 2010

Related U.S. Application Data

(62) Division of application No. 10/533,466, filed as application No. PCT/FR03/03219 on Oct. 29, 2003, now Pat. No. 7,807,090.

(30) Foreign Application Priority Data

Oct. 30, 2002 (FR) ..................................... 02 13588

(51) Int. Cl.

| | |
|---|---|
| *C10M 169/04* | (2006.01) |
| *B29C 33/64* | (2006.01) |
| *C08K 5/00* | (2006.01) |
| *C08L 83/06* | (2006.01) |
| *B29C 35/02* | (2006.01) |
| *B29C 35/08* | (2006.01) |

(52) U.S. Cl.
CPC ............ *C10M 169/044* (2013.01); *B29C 33/64* (2013.01); *C08K 5/0025* (2013.01); *C08L 83/06* (2013.01); *B29C 35/02* (2013.01); *B29C 2035/0827* (2013.01); *C10M 2207/04* (2013.01); *C10M 2211/024* (2013.01); *C10M 2229/0405* (2013.01); *C10N 2240/58* (2013.01); *C10N 2250/141* (2013.01)

(58) Field of Classification Search
CPC .............................. C08G 77/14; C09D 5/1675
USPC .......................................................... 525/474
See application file for complete search history.

(56) References Cited

U.S. PATENT DOCUMENTS

| | | | |
|---|---|---|---|
| 2,811,408 A | 10/1957 | Braley | |
| 3,321,019 A | 5/1967 | Dmitroff et al. | |
| 4,256,870 A | 3/1981 | Eckberg | |
| 4,681,714 A | 7/1987 | Lopes et al. | |
| 5,364,888 A | 11/1994 | Aoki et al. | |
| 5,639,413 A * | 6/1997 | Crivello | 264/401 |
| 5,650,453 A * | 7/1997 | Eckberg et al. | 522/31 |
| 6,313,255 B1 | 11/2001 | Rubinsztajn | |

FOREIGN PATENT DOCUMENTS

| | | |
|---|---|---|
| EP | 0473995 | 3/1992 |
| EP | 0476925 | 3/1992 |
| EP | 0599615 | 6/1994 |
| EP | 1215254 | 6/2002 |
| WO | WO 00/77083 | 12/2000 |
| WO | WO 02/06030 | 1/2002 |

OTHER PUBLICATIONS

Odian, Principles of Polymerization, 2nd Ed., McGraw-Hill, 1981 (pp. 20-25).*
Datasheet of BLUE STAR SILCOLEASE® UV RCA 200.
Datasheet of BLUE STAR SILCOLEASE® UV CATA 211.
Datasheet of BLUE STAR SILCOLEASE® UV POLY 200.

* cited by examiner

*Primary Examiner* — Kuo-Liang Peng
(74) *Attorney, Agent, or Firm* — Brooks Kushman P.C.

(57) ABSTRACT

A stripping composition, and a method of making the stripping composition. The stripping composition including 100 parts by weight of a base ingredient consisting in epoxy polydimethylsiloxane, 0.5 to 10 parts by weight of a polymerization agent for polymerizing the base ingredient and constituted by a diaryliodonium salt, not more than 30 parts by weight of an anti-adhesion modulator constituted by a silicone polymer; and not more than 40 parts by weight of an anti-stick agent making the composition less tacky prior to polymerization and constituted by at least one vinyl ether compound.

19 Claims, No Drawings

STRIPPING COMPOSITION FOR A MOLD FOR MAKING A COMPOSITE MATERIAL PART, AND METHOD OF PREPARING

This application is a divisional application of co-pending U.S. application Ser. No. 10/533,446, which is the 35 USC 371 national stage of international application PCT/FR2003/003219, filed on 29 Oct. 2003, which claims the priority of French Application No. 02/13588 filed Oct. 30, 2002. The entire contents of each of the above identified applications are incorporated by reference.

FIELD OF THE INVENTION

The present invention relates to a mold for making a composite material part, the mold being coated in a stripping composition. Although not exclusively, the present invention applies particularly to helicopter blades or to helicopter blade elements, which are usually manufactured by molding a composite material.

BACKGROUND OF THE INVENTION

In order to make it easier to extract such blades or blade elements from the mold after polymerization, it is conventional initially to apply a stripping composition over the entire surface of the mold.

Known stripping compositions contain a large proportion of solvent, and as a result present numerous drawbacks, such as the large quantities that need to be used and the volatile organic compounds that are dumped into the environment.

SUMMARY OF THE INVENTION

An object of the present invention is to remedy those drawbacks. The invention relates to a mold coated in a solvent-free anti-adhesive stripping composition that is particularly effective.

To this end, according to the invention, a mold for making a composite material part is coated in a stripping composition comprising:
 100 parts by weight of a base ingredient consisting in epoxy polydimethylsiloxane;
 0.5 to 10 parts by weight of a polymerization agent for polymerizing the base ingredient and constituted by a diaryliodonium salt;
 not more than 30 parts by weight of an anti-adhesion modulator constituted by a silicone polymer; and
 not more than 40 parts by weight of an anti-stick agent making the composition less tacky prior to polymerization and constituted by at least one vinyl ether compound.

Preferably, the anti-adhesion modulator is also constituted by an epoxy polydimethylsiloxane.

As base ingredient and as adhesion modulator, it is possible to use respectively the products manufactured by the supplier Rhodia and having the following trade names respectively: UV POLY 200 and UV RCA 200. UV POLY 200 has a viscosity at 25° C. of 300 mm²/s and UV RCA 200 has a viscosity at 25° C. of 600 mm²/s. Similarly, the polymerization agent based on diaryliodonium salt can be that manufactured and sold under the trade name UV CATA 211 by said supplier Rhodia.

Said anti-stick agent (which serves amongst other things to enable the stripping composition to be spread easily on the walls of the mold and significantly to reduce the sticky appearance left by the epoxy polydimethylsiloxane when not polymerized) can be constituted by a mixture of a monovinyl ether and a divinyl ether.

In a preferred embodiment, the monovinyl ether is dodecyl monovinyl ether [formula $CH_3—(CH_2)_{11}—O—CH=CH_2$], while the divinyl ether is 1.4 cyclohexane dimethanol divinyl ether [formula $CH_2=CH—O—C_6H_{10}—O—CH=CH_2$].

Advantageously, said stripping composition adapted to the mold comprises:
 5 to 7 parts by weight of the polymerization agent;
 5 to 10 parts by weight of the anti-adhesion modulator, said anti-adhesion modulator being an epoxy polydimethylsiloxane; and
 the anti-stick agent being present at a concentration in the range 8 to 12 parts by weight of a dodecyl monovinyl ether and 8 to 12 parts by weight of a cyclohexane dimethanol divinyl ether.

More advantageously, the stripping composition has:
 6 parts by weight of the polymerization agent;
 8 parts by weight of the anti-adhesion modulator; and
 the anti-stick agent being present at a concentration of 11.4 parts by weight of a dodecyl monovinyl ether and 11.4 parts by weight of a cyclohexane dimethanol divinyl ether.

DETAILED DESCRIPTION OF THE INVENTION

Thus, by means of the invention, a solvent-free stripping composition is obtained which presents very good anti-adhesion properties, in particular because it is made on the basis of silicone. This stripping composition also presents good performance in terms of sticking behavior and painting behavior of the composite part made by molding. Because of the chemical characteristics of said composition which is based on epoxy siloxanes, the small amount that might be transferred during molding has no significant negative influence on the sticking properties or on the painting behavior of the part, contrary to that which can be observed with stripping compositions based on solvent.

It should be observed that compared with usual stripping compositions based on solvent, the composition of the invention obtained from the above-specified mixture also presents the following advantages:
 elimination of the problem of dumping volatile organic compounds;
 reduction in the quantity of composition consumed;
 reduction in the time required to apply the composition;
 improvement in the sticking characteristics on the composite material; and
 improvement in surface appearance.

The stripping composition of the invention polymerizes under the action of ultraviolet radiation or on application of heat. The polymerization cycle by heating may comprise 1 hour at 150° C. (±5° C.)

Nevertheless, depending on the intended application, this cycle can be optimized, e.g. to 30 minutes at 100° C.

The stripping composition of the invention is liquid and it is applied to the surface of the mold at very small thickness (generally of the order of one micrometer), preferably by hand, using a cloth or by means of wipes pre-impregnated with the composition.

Generally, it is not necessary to apply the composition to the mold for each molding operation. The number of molding operations that are possible using a coating of the composition of the present invention depends on the type of molding that is performed, and it generally remains equivalent to that obtained with usual stripping compositions based on solvent.

It should be observed that the stripping composition of the invention is effective for polymerizing any composite part in molds made of metal or of composite material, using epoxy resins of a class less than or equal to 180° C.

What is claimed is:

1. A method of making a polymerizable stripping composition for coating a mold, said method comprising combining the following:

100 parts by weight of a base ingredient comprising a first epoxy polydimethylsiloxane;

0.5 to 10 parts by weight of a polymerization agent comprising a diaryliodonium salt for polymerizing said base ingredient;

5 to 10 parts by weight of an anti-adhesion modulator comprising a second epoxy polydimethylsiloxane, different from the first epoxy polydimethylsiloxane, the first and second epoxy polydimethylsiloxanes being from different products and the second epoxy polydimethylsiloxane having a higher viscosity than the first epoxy polydimethylsiloxane; and an antistick agent comprising 8 to 12 parts by weight of dodecyl monovinyl ether compound and 8 to 12 parts by weight of cyclohexane dimethanol divinyl ether in the stripping composition to form a solvent-free polymerizable liquid stripping composition, said stripping composition being polymerizable by application of heat.

2. The method according to claim 1, wherein said stripping composition is capable of being polymerized by heating at 150° C.±5° C. for 1 hour.

3. The method according to claim 1, wherein said stripping composition is capable of being polymerized by heating at 100° C. for 30 minutes.

4. The method according to claim 1, wherein said cyclohexane dimethanol divinyl ether in the antistick agent is 1,4 cyclohexane dimethanol divinyl ether.

5. A stripping composition obtained as per the method in claim 4.

6. The method according to claim 1, wherein said stripping composition comprises:

5 to 7 parts by weight of said polymerization agent; and said antistick agent is obtained by mixing the dodecyl monovinyl ether compound with the cyclohexane dimethanol divinyl ether.

7. The method according to claim 1, wherein said stripping composition comprises:

6 parts by weight of said polymerization agent;

8 parts by weight of said anti-adhesion modulator;

11.4 parts by weight of said dodecyl monovinyl ether; and 11.4 parts by weight of said cyclohexane dimethanol divinyl ether.

8. A stripping composition obtained as per the method in claim 1.

9. The metal according to claim 1 wherein the first epoxy polydimethylsiloxane has a viscosity at 25° C. of 300 mm$^2$/s and the second epoxy polydimethylsiloxane has a viscosity at 25° C. of 500 mm$^2$/s.

10. The method of claim 1 wherein the first and second epoxy polydimethylsiloxanes together form a bimodal chain length distribution.

11. A heat polymerizable stripping composition comprising:

100 parts by weight of a base ingredient comprising a first epoxy polydimethylsiloxane;

0.5 to 10 parts by weight of a polymerization agent comprising a diaryliodonium salt for polymerizing said base ingredient;

5 to 10 parts by weight of an anti-adhesion modulator, said anti-adhesion modulator comprising a second epoxy polydimethylsiloxane the first and second epoxy polydimethylsiloxanes being from different products and the second epoxy polydimethylsiloxane having a higher viscosity than the first epoxy polydimethylsiloxane wherein the first and second epoxy polydimethylsiloxanes together form a bimodal chain length distribution; and an antistick agent comprising 8 to 12 parts by weight of dodecyl monovinyl ether compound and 8 to 12 parts by weight of cyclohexane dimethanol divinyl ether in the stripping composition.

12. The composition of claim 11 wherein the first epoxy polydimethylsiloxane has a viscosity at 25° C. of 300 to mm$^2$/s and the second epoxy polydimethylsiloxane having a viscosity at 25° C. of 600 mm$^2$/s.

13. The composition of claim 11 wherein the composition consists essentially of the first epoxy polydimethylsiloxane, the diaryliodonium salt, the second epoxy polydimethylsiloxane, the dodecyl monovinyl ether, and cyclohexane dimethanol divinyl ether.

14. A stripping composition application system comprising:

a cloth pre-impregnated with a heat polymerizable liquid and solution-free stripping composition comprising:

100 parts by weight of a base ingredient comprising a first epoxy polydimethylsiloxane; 0.5 to 10 parts by weight of a polymerization agent comprising a diaryliodonium salt for polymerizing said base ingredient;

5 to 10 parts by weight of an anti-adhesion modulator, said anti-adhesion modulator comprising a second epoxy Polydimethylsiloxane; and an antistick agent comprising 8 to 12 parts by weight of dodecyl monovinyl ether compound and 8 to 12 parts by weight of cyclohexane dimethanol divinyl ether in the stripping composition.

15. A method of applying a stripping composition to a mold, said method comprising:

providing a mold having a mold surface;

providing a heat polymerizable liquid and solvent-free stripping composition comprising:

100 parts by weight of a base ingredient comprising a first epoxy polydimethylsiloxane;

0.5 to 10 parts by weight of a polymerization agent comprising a diaryliodonium salt for polymerizing said base ingredient;

5 to 10 parts by weight of an anti-adhesion modulator, said anti-adhesion modulator comprising a second epoxy Polydimethylsiloxane; and an antistick agent comprising 8 to 12 parts by weight of dodecyl monovinyl ether compound and 8 to 12 parts by weight of cyclohexane dimethanol divinyl ether in the stripping composition;

applying the stripping composition to the surface of the mold in a thickness on the order of one micrometer; and heating the stripping composition to polymerize the stripping composition.

16. The method of claim 15 wherein the step of providing the stripping composition comprises providing a wipe pre-impregnated with the stripping composition, and the step of applying the stripping composition comprises hand wiping the wipe over the mold surface.

17. A stripping composition applicator comprising:
a wipe pre-impregnated with a stripping composition, the stripping composition comprising:
100 parts by weight of a base ingredient comprising a first epoxy polydimethylsiloxane;
0.5 to 10 parts by weight of a polymerization agent comprising a diaryliodonium salt for polymerizing said base ingredient;
5 to 10 parts by weight of an anti-adhesion modulator, said anti-adhesion modulator comprising a second epoxy polydimethylsiloxane; and
an antistick agent comprising 8 to 12 parts by weight of dodecyl monovinyl ether compound and 8 to 12 parts by weight of cyclohexane dimethanol divinyl ether in the stripping composition;
the polymerizable stripping composition being in a liquid form, solvent-free and curable by heat.

18. The applicator of claim 17 wherein the first and second epoxy polydimethylsiloxanes are from different products and the second epoxy polydimethylsiloxane has a higher viscosity than the first epoxy polydimethylsiloxane.

19. The composition of claim 17 wherein the first epoxy polydimethylsiloxane has a viscosity at 25° C. of 300 $mm^2/s$ and the second epoxy polydimethylsiloxane has a viscosity at 25° C. of 500 to 800 $mm^2/s$.

* * * * *